US012623143B2

(12) United States Patent
Osborne et al.

(10) Patent No.: US 12,623,143 B2
(45) Date of Patent: May 12, 2026

(54) AI RESPONSIVE LAYOUT FOR CROSS-PLATFORM ENVIRONMENTS

(71) Applicant: Sony Interactive Entertainment Inc., Tokyo (JP)

(72) Inventors: Elizabeth Osborne, Oakland, CA (US); Angela Sun Wu, San Francisco, CA (US); Jin Zhang, Belmont, CA (US); Xi Zhou, Sunnyvale, CA (US); Hsin-Yi Chien, San Jose, CA (US); Olga Rudi, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 254 days.

(21) Appl. No.: 18/481,121

(22) Filed: Oct. 4, 2023

(65) Prior Publication Data

US 2025/0114695 A1 Apr. 10, 2025

(51) Int. Cl.
*A63F 13/00* (2014.01)
*A63F 13/355* (2014.01)
*G06T 3/40* (2006.01)
*G06V 10/764* (2022.01)

(52) U.S. Cl.
CPC .............. *A63F 13/355* (2014.09); *G06T 3/40* (2013.01); *G06V 10/764* (2022.01)

(58) Field of Classification Search
CPC ...... A63F 13/323; A63F 13/355; A63F 13/52; A63F 13/67; G06T 3/40; G06V 10/764
See application file for complete search history.

(56) References Cited

U.S. PATENT DOCUMENTS

| | | | | |
|---|---|---|---|---|
| 10,569,174 B1 * | 2/2020 | Wheeler | ................ | A63F 13/42 |
| 2020/0404174 A1 * | 12/2020 | Taxbøl | .................. | H04N 23/80 |
| 2021/0021900 A1 | 1/2021 | Kansara et al. | | |
| 2021/0093968 A1 * | 4/2021 | McCoy | .............. | A63F 13/5258 |
| 2021/0334547 A1 * | 10/2021 | Cohen-Tidhar | ........ | G06V 10/82 |
| 2022/0379203 A1 * | 12/2022 | Owens | ................... | A63F 13/67 |

FOREIGN PATENT DOCUMENTS

| | | | |
|---|---|---|---|
| EP | | 2415505 A2 | 2/2012 |
| WO | WO 2018/208365 A1 | | 11/2018 |

OTHER PUBLICATIONS

International Search Report and Written Opinion in International Appln. No. PCT/US2024/048688, mailed on Jan. 14, 2025, 11 pages.

* cited by examiner

*Primary Examiner* — Justin L Myhr
(74) *Attorney, Agent, or Firm* — Fish & Richardson P.C.

(57) ABSTRACT

A method including executing a video game to generate a video frame for presentation on a device of a first platform for a game play by a user. The method including determining a target device of a second platform. The method including mapping the video frame to the target device. The method including determining an area of focus in a scene in the video frame based on a game context. The method including classifying an asset in the area of focus using a computer vision model implementing artificial intelligence. The method including determining that the asset is important in the game play using the computer vision model. The method including determining that the asset in the video frame that is mapped does not meet a threshold of visibility. The method including modifying the video frame that is mapped so that the asset meets the threshold of visibility.

17 Claims, 7 Drawing Sheets

200

Executing a video game to generate a video frame for presentation on a first device of a first platform, wherein the video frame is generated for a game play of the video game by a user — 210

Determining a target device, wherein the target device is of a second platform — 220

Mapping the video frame from the first device to the target device, wherein the video frame that is mapped is presented on the target device — 230

Determining an area of focus in a scene of the game play presented in the video frame based on a game context of the scene in the game play — 240

Classifying an asset in the area of focus using a computer vision model implementing artificial intelligence — 250

Determining that the asset is important in the game play of the video game using the computer vision model — 260

Determining that the asset in the video frame that is mapped to the target device does not meet a threshold of visibility — 270

Modifying the video frame that is mapped so that the asset meets the threshold of visibility — 280

<u>200</u>

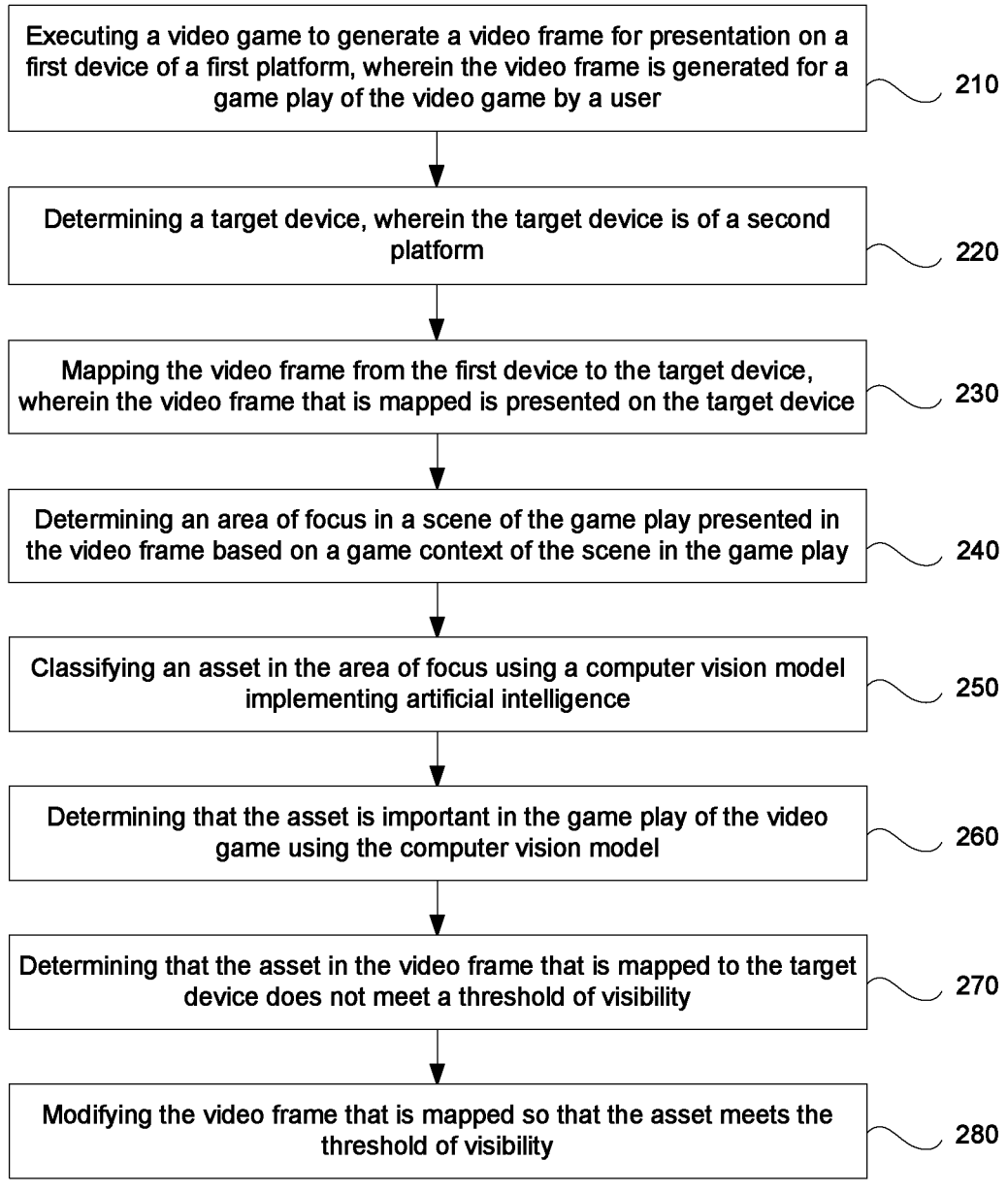

Executing a video game to generate a video frame for presentation on a first device of a first platform, wherein the video frame is generated for a game play of the video game by a user — 210

Determining a target device, wherein the target device is of a second platform — 220

Mapping the video frame from the first device to the target device, wherein the video frame that is mapped is presented on the target device — 230

Determining an area of focus in a scene of the game play presented in the video frame based on a game context of the scene in the game play — 240

Classifying an asset in the area of focus using a computer vision model implementing artificial intelligence — 250

Determining that the asset is important in the game play of the video game using the computer vision model — 260

Determining that the asset in the video frame that is mapped to the target device does not meet a threshold of visibility — 270

Modifying the video frame that is mapped so that the asset meets the threshold of visibility — 280

604  MEMORY

602  CPU

PLATFORM TRANSFORMATION ENGINE
120

606  STORAGE

622

608  USER INPUT DEVICE

618  GRAPHICS MEMORY

616  GPU

GRAPHICS SUBSYSTEM

614  NETWORK INTERFACE

620

612  AUDIO PROCESSOR

610  DISPLAY

AI RESPONSIVE LAYOUT FOR CROSS-PLATFORM ENVIRONMENTS

TECHNICAL FIELD

The present disclosure is related to modifying content of a video game when delivering video frames for display on a cross-platform device using artificial intelligence techniques, such as computer vision.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop computers, laptop computers, mobile phones, etc.

A user may play a video game that is designed for presentation on a particular platform without any issues, but is playing the game on another platform that is more limiting, such as a smaller display. For example, the video game may be executing on a game console for display of video frames on a large screen television or screen monitor, but the user is actually viewing the game play on a mobile device (e.g., tablet, phone, etc.). This may occur when the video game is executing on a game console with video frames being transmitted to the mobile device for display, or the video frame is executing on the mobile device for display. In these cases, the content in the video frames may be compromised, such that one or more objects may not be displayed in a manner that is satisfactory to the user, including when content has been reduced to fit the screen of the mobile device so much such that the user is unable to easily view the content or portions of the content.

It is in this context that embodiments of the disclosure arise.

SUMMARY

Embodiments of the present disclosure relate to cross-platform modification of content using artificial intelligence such that important assets meet a threshold of visibility requirement. Identification of issues when displaying content on a cross-platform device using artificial intelligence may be performed during development of a video game or in real-time during game play of the video game.

In one embodiment, a method is disclosed. The method including executing a video game to generate a video frame for presentation on a first device of a first platform, wherein the video frame is generated for a game play of the video game by a user. The method including determining a target device, wherein the target device is of a second platform. The method including mapping the video frame from the first device to the target device, wherein the video frame that is mapped is presented on the target device. The method including determining an area of focus in a scene of the game play presented in the video frame based on a game context of the scene in the game play. The method including classifying an asset in the area of focus using a computer vision model implementing artificial intelligence. The method including determining that the asset is important in the game play of the video game using the computer vision model. The method including determining that the asset in the video frame that is mapped to the target device does not meet a threshold of visibility. The method including modifying the video frame that is mapped so that the asset meets the threshold of visibility.

In another embodiment, a non-transitory computer-readable medium storing a computer program for execution by a processor to perform a method is disclosed. The computer-readable medium including program instructions for executing a video game to generate a video frame for presentation on a first device of a first platform, wherein the video frame is generated for a game play of the video game by a user. The computer-readable medium including program instructions for determining a target device, wherein the target device is of a second platform. The computer-readable medium including program instructions for mapping the video frame from the first device to the target device, wherein the video frame that is mapped is presented on the target device. The computer-readable medium including program instructions for determining an area of focus in a scene of the game play presented in the video frame based on a game context of the scene in the game play. The computer-readable medium including program instructions for classifying an asset in the area of focus using a computer vision model implementing artificial intelligence. The computer-readable medium including program instructions for determining that the asset is important in the game play of the video game using the computer vision model. The computer-readable medium including program instructions for determining that the asset in the video frame that is mapped to the target device does not meet a threshold of visibility. The computer-readable medium including program instructions for modifying the video frame that is mapped so that the asset meets the threshold of visibility.

In still another embodiment, a computer system is disclosed, wherein the computer system includes a processor and memory coupled to the processor and having stored therein instructions that, if executed by the computer system, cause the computer system to execute a method. The method including executing a video game to generate a video frame for presentation on a first device of a first platform, wherein the video frame is generated for a game play of the video game by a user. The method including determining a target device, wherein the target device is of a second platform. The method including mapping the video frame from the first device to the target device, wherein the video frame that is mapped is presented on the target device. The method including determining an area of focus in a scene of the game play presented in the video frame based on a game context of the scene in the game play. The method including classifying an asset in the area of focus using a computer vision model implementing artificial intelligence. The method including determining that the asset is important in the game play of the video game using the computer vision model. The method including determining that the asset in the video frame that is mapped to the target device does not meet a threshold of visibility. The method including modifying the video frame that is mapped so that the asset meets the threshold of visibility.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 2 is a flow diagram illustrating a method for cross-platform modification of content using an AI model configured to identify important assets in video content and ensure that display of those important assets meet a visibility requirement, in accordance with one embodiment of the present disclosure.

DETAILED DESCRIPTION

Figure 1:
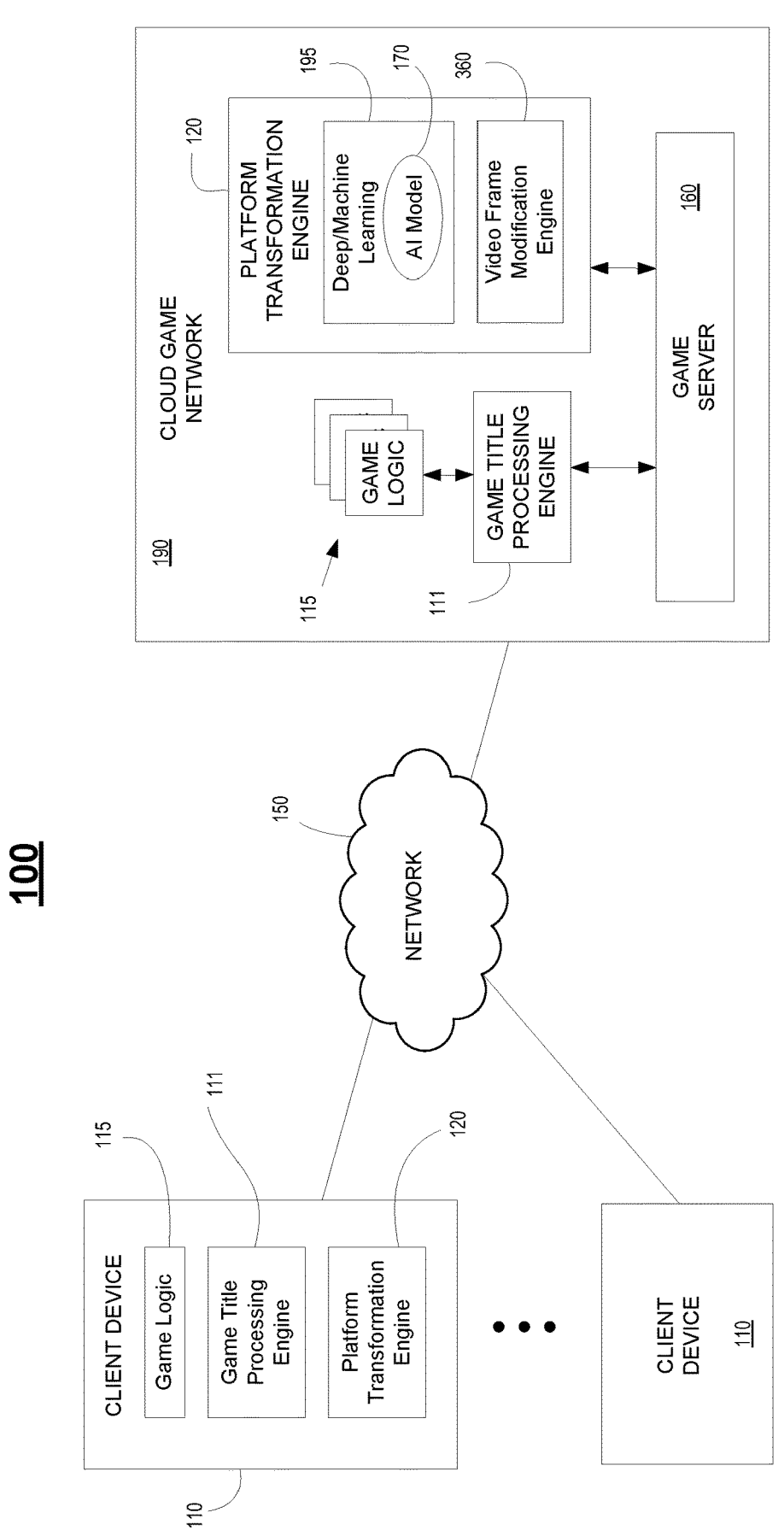
FIG. 1 illustrates a system configured for cross-platform modification of content using artificial intelligence (AI), in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure are set forth without any loss of generality to, and without imposing limitations upon, the claims that follow this description.

Generally speaking, the various embodiments of the present disclosure describe systems and methods for modifying content of a video game when delivering video frames for display on a cross-platform device using artificial intelligence (AI) techniques, such as computer vision. A general process may include one or more of, and in no particular order, scaling a video frame to fit a display of a target platform (e.g., dumb scaling-all to smaller sizes), analyzing the scaled video frame to determine if assets can be seen, transforming an asset that is visually compromised when that asset is a focus of game context, and performing a field of view (FOV) change if needed (e.g., dumb zooming to an area of focus surrounding the asset). In one embodiment, content is modified at runtime by adjusting the display of content for the platform being detected. For example, the display of content is dynamically adapted based on the platform it is being viewed on (i.e., a cross-platform that is different than the game designed platform to which video frames are generated during execution of a video game). For example, if the content is being accessed on a mobile device rather than a full display, the layout and formatting will be adjusted to fit the smaller screen size and ensure optimal user experience. This adjustment happens in real-time as the platform is detected. In particular, computer vision implementing AI is used to identify issues with the layout when the content is shown on the different or cross-platform. That is, computer vision technology is utilized to analyze the layout to detect any potential issues that may arise when the content is displayed on the cross-platform based on a visibility threshold. By leveraging computer vision algorithms, the system can identify inconsistencies, such as misaligned elements, overlapping content, or improper scaling, which may occur due to variations in screen sizes or resolutions across the different or cross-platforms. For instance, video content can be scaled or mapped (e.g., performing dumb scaling) to a cross-platform device for display. An asset within the video content is analyzed to determine if that asset is a focus of the game context (i.e., is important to the game play based on game context), and whether that asset meets a visibility threshold. When the asset is determined to be important within the game context a transformation is performed on the asset (e.g., different asset, different form of the asset, modification to the asset, etc.) such that the display of the asset meets the visibility threshold. In one instance, a field-of-view (FOV) adjustment is made (e.g., smaller and/or focused FOV surrounding the asset), such as when performing dumb zooming. In another embodiment, a set of specialized tools is provided to developers for testing and evaluating various aspects of the layouts to cross-platform devices, such as functionality, compatibility, and visual presentation. In particular, computer vision implementing AI is used to identify issues with the layout when the content is shown on different cross-platforms. These developer tools assist in verifying that the layouts behave as intended, function properly across different platforms or devices, and adhere to design specifications. They can include features for previewing layouts, debugging code, simulating different environments, and collecting performance metrics, among others.

Advantages of the methods and systems configured to perform cross-platform modification of content using artificial intelligence based on a threshold of visibility requirement include the automatic identification of issues with the layout of content displayed on a cross-platform device. Additional advantages include automatic identification of important assets in areas of the layout that have presentation issues on the cross-platform device. Further advantages include the automatic modification of the content to ensure visibility to the user of important assets. In that manner, the user is able to view content (e.g., from a video game) on a cross-platform device, even though the content was originally designed and generated for display on another device, such as a display device.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 configured for cross-platform modification of content using artificial intelligence, in accordance with one embodiment of the present disclosure. The system includes a platform transformation engine 120 including an AI model 170 that provides for classification and/or identification of important assets in one or more video frames, and any issues that may transpire when presenting those important assets on a cross-platform device.

As shown, system 100 may provide gaming over a network 150 for one or more client devices 110. In particular, system 100 may be configured to enable users to interact with interaction applications, including provide gaming to users participating in a single-player or multi-player gaming sessions (e.g., participating in a video game in single-player or multi-player mode, or participating in a metaverse generated by an application with other users, etc.) via a cloud game network 190, wherein the game can be executed locally (e.g., on a local client device of a corresponding user) or can be executed remotely from a corresponding client device 110 (e.g., acting as a thin client) of a corresponding user that is playing the video game, in accordance with one embodiment of the present disclosure. In at least one capacity, the cloud game network 190 supports a multi-player gaming session for a group of users, to include delivering and receiving game data of players for purposes of coordinating and/or aligning objects and actions of players within a scene of a gaming world or metaverse, managing communications between user, etc. so that the users in distributed locations participating in a multi-player gaming session can interact with each other in the gaming world or metaverse in real-time. In another capacity, the cloud game network 190 supports multiple users participating in a metaverse.

In one embodiment, the cloud game network 190 may support artificial intelligence (AI) based services including chatbot services (e.g., ChatGPT, etc.) that provide for one or more features, such as conversational communications, composition of written materiel, composition of music, answering questions, simulating a chat room, playing games, and others.

Users access the remote services with client devices 110, which include at least a CPU, a display and input/output (I/O). For example, users may access cloud game network 190 via communications network 150 using corresponding client devices 110 configured for providing input control, updating a session controller (e.g., delivering and/or receiving user game state data), receiving streaming media, etc. The client device 110 can be a personal computer (PC), a mobile phone, a personal digital assistant (PAD), handheld device, etc.

In one embodiment, as previously introduced, client device 110 may be configured with a game title processing engine 111 and game logic 115 (e.g., executable code) that is locally stored for at least some local processing of an application, and may be further utilized for receiving streaming content as generated by the application executing at a server, or for other content provided by back-end server support.

In another embodiment, client device 110 may be configured as a thin client providing interfacing with a back end server (e.g., game server 160 of cloud game network 190) configured for providing computational functionality (e.g., including game title processing engine 111 executing game logic 115—i.e., executable code—implementing a corresponding application). In particular, client device 110 of a corresponding user is configured for requesting access to applications over a communications network 150, such as the internet, and for rendering for display images generated by a video game executed by the game server 160, wherein encoded images are delivered (i.e., streamed) to the client device 110 for display. For example, the user may be interacting through client device 110 with an instance of an application executing on a game processor of game server 160 using input commands to drive a gameplay. Client device 110 may receive input from various types of input devices, such as game controllers, tablet computers, keyboards, gestures captured by video cameras, mice, touch pads, audio input, etc.

In addition, system 100 includes an platform transformation engine 120 including an AI model 170 that is configured to classify and/or identify important assets shown in a video frame generated through execution of an application (e.g., video game), and determine whether there are visibility issues when presenting those assets on a cross-platform device, such as when those assets do not meet a visibility threshold or requirement. If there are issues that are identified in the presentation of the video frame, the video frame modification engine 360 is configured to modify content in the video frame such that the important assets meet the threshold visibility requirement. The platform transformation engine 120 may be implemented at the back-end cloud game network, or in some implementations may be located at a client device 110. The classification and/or identification and/or prediction of important assets and any visibility issues of those assets may be performed using artificial intelligence (AI) via an AI layer. For example, the AI layer may be implemented via an AI model 170 as executed by a deep/machine learning engine 195 of the platform transformation engine 120.

With the detailed description of the system 100 of FIG. 1, flow diagram 200 of FIG. 2 discloses a method for cross-platform modification of content using an AI model configured to classify and/or identify important assets in video content and ensure that display of those important assets meet a visibility requirement, in accordance with one embodiment of the present disclosure. The operations performed in the flow diagram may be implemented by one or more of the entities previously described components, and also system 100 described in FIG. 1, including the platform transformation engine 120.

At 210, the method includes executing a video game to generate a video frame for presentation on a first device of a first platform, wherein the video frame is generated for a game play of the video game by a user. As previously described, the video game can be executed on a local device (e.g., for gaming in single-player mode or multi-player mode, etc.) or can be executed over a cloud gaming network for single-player or multi-player gaming sessions. More particularly, the video frames are generated based on a pre-selected platform device, such that the video game is designed for execution on the pre-selected platform (e.g., gaming console, personal computer, tablet, hand-held device, etc.). For example, the video game may be designed for execution on a first platform, such as being executed on a gaming console, with display of the video frames on a full-screen display to give the user the best experience. However, while the video frames may be generated using the first platform (e.g., gaming console), the video frames are presented on a different, target display device of a different platform (i.e., cross-platform device), such as a tablet or mobile phone which is smaller than being displayed on the first platform (e.g., full display). In other implementations, the video frames may be generated and displayed on the target platform or cross-platform, such as a hand held device. Still other combinations of devices of one or more platforms for execution and display are supported. While embodiments of the present disclosure are described within the context of a video game, it is understood that cross-platform content modification can be performed on content generated from any type of application.

At 220, the method includes determining a target device used for displaying the video frames that are generated, wherein the target device is of a second platform or cross-platform. In particular, while the video frames are generated intended for display on a first platform (i.e., objects are arranged and presented fully within the video frame with the expectation for display on a first platform device), the video frames are instead displayed on a device of the second platform. That is, even though the game is designed for display on the full-screen display (i.e., the first platform), it is understood that the user may play or view the video game on a different or cross-platform device, such as a mobile phone, that has a different viewing area, which in this example is a smaller viewing area (i.e., smaller screen space). As such, the user is playing and viewing the video game as displayed on a target device, which is of a different platform than the first platform to which the video game is designed for displaying content.

At 230, the method includes mapping the video frame from the first device to the target device (i.e., the cross-platform device), wherein the video frame that is mapped is presented on the target device. In general, there may be some limitations when presenting the video frame on the target device, which may be addressed or at least considered when mapping video frames to the target device. As such, tools may be used when performing mapping between devices to avoid disadvantages to users of different platforms. For example, games designed for gaming consoles (i.e., controller input, execution on console, and presentation on full display) may need to be adjusted when performing mapping for a target or cross-platform device (e.g., PCs, hand held devices, etc.) to make the games easier, more intuitive, etc. when playing on the cross-platform device (e.g., a PC platform that uses a keyboard for providing input commands, or handheld device that uses a touch screen for providing input commands). In that manner, the content presented with the mapped video frames presented on the cross-platform display and/or the interfacing with that content may be different than the content that is presented for the designed or first platform (e.g., full display).

For example, some considerations may need to be addressed when performing the mapping, such as how inputs are implemented for the different platform devices (e.g., a toggle on a controller of the first platform may be implemented with a motion across a touch screen in the second platform). In addition, another consideration when mapping between devices is how much information (e.g., objects, etc.) should be included in each of the platform devices. For instance, all the information is normally included under the first platform as designed for the video game; however, because the cross-platform device may have a smaller display, less information may be available by design or by inability of the cross-platform device to show all the information of the video frame at one time. Further, users playing on the first platform device may typically use headphones (e.g., assuming execution on a game console and presentation on a full display); whereas, users on the cross-platform device (e.g., mobile phone) typically would not use headphones and instead rely on built-in speakers of the cross-platform device that may be deficient in some manner (e.g., not loud enough in outdoor or public settings). Thus, when presenting on a mobile device the mapped video frame may include indicators on the screen, wherein the indicators provide visual information that normally would have been heard using headphones.

In some embodiments, mapping may include a straightforward scaling, or dumb scaling. In that manner, the entirety of the content or information in a corresponding video frame is included when mapping, but is scaled down to fit the viewing screen of the target or cross platform display device. However, there are issues that may arise when performing dumb scaling. For example, one issue may be a distortion of game space, such that relational spacing between objects are altered beyond user expectation (i.e., objects appear to be out of place), or relational sizing between objects appear to be unnatural (i.e., objects appear larger than normal when compared to other objects in the scene). In addition, dumb scaling may present content of the corresponding video frame in a size that does not allow a user to play the game (i.e., objects are too small for viewing).

At 240, the method includes determining an area of focus in a scene of the game play as presented in the video frame based on a game context of the scene of one or more video frames. Game state data generated during execution of the video game when generating video frames for a corresponding game play at a particular point is used for determining a game context of the game play. For example, the game state data may include a state of the video game during execution, wherein game state data allows for the generation of the gaming environment at the corresponding point in the game play. Game state data may include states of devices used for rending the game play (e.g., states of the CPU, GPU, memory, register values, etc.), identification of the executable code to execute the video game at that point, game characters, game objects, object and/or game attributes, graphic overlays, and other information. User saved data may also be analyzed to determine game context, wherein user data personalizes the video game for the corresponding user, such as character information or attributes for personalizing a character, loadout of a character that makes the character unique to the user, use profile data, etc. As such, the game state data, and optionally user data, may be used to determine the game context of the game play, such as where in the game the user is, type of game, mood of the game, rating of game (e.g., maturity level), the number of other players there are in the gaming environment, game dimension displayed, which players are playing a particular gaming session, descriptive information, game title, game title version, franchise, format of game title distribution, downloadable content accessed, links, credits, achievements, awards, trophies, and other information.

Based on the game context, an area of focus in a scene of a corresponding video frame may be determined. For example, the area of focus may define a portion of the video frame and/or scene presented in the video frame towards attention of the user is directed. The area of focus may align with a focus of interaction by the user in the scene. For example, when a user is battling a boss in the video game, the area of focus may include the immediate area surrounding the boss and the character of the user. That is, during the battle the attention of the user is directed towards the boss and/or the character of the user. Whereas other portions and/or areas of the scene (e.g., peripheral areas, background, etc.) may have less importance to the user, and as such the user pays little or no attention to those areas outside of the area of focus.

At 250, the method includes classifying an asset in the area of focus using a computer vision model implementing artificial intelligence (AI). In particular, the computer vision model may be trained using known assets (e.g., objects, information, content, etc.) that are found in the video game, wherein the training is performed using AI techniques. For example, the computer vision model can be trained using a list of assets for the video game. Further, training can include presenting the list of assets in different gaming environments. As such, the computer vision model implementing artificial intelligence can analyze a scene or a portion of the scene (e.g., the area of focus of the scene) generated for a corresponding video frame of the video game to identify and/or classify assets within the scene or portion of the scene.

At 260, the method includes determining that the asset is important in the game play of the video game using the computer vision model. For example, the computer vision model may analyze one or more of game state data, user data, and/or game context to determine whether the asset has a measurable importance indicating that the asset should be available to the user, such as in such a manner providing for interaction (e.g., viewing, manipulation, etc.). That is, when the asset is not important, whether or not the asset is made available to the user has little or no consequence in affecting an outcome of the game play of the video game. On the other hand, when the asset is important, whether or not the asset is made available to the user will affect the outcome of the game play. Furthermore, outcomes of interactions with the asset deemed important will also affect the outcome of the game play. In other words, the asset should be made available to the user for interaction when the asset is determined to be important. For example, a weapon available for pickup that is vital to defeating a boss during a battle may be determined to be important, and should be made available for interaction by the user.

At 270, the method includes determining that the asset in the video frame that is mapped to the target device does not meet or satisfy a threshold of visibility. The asset has been determined to be important, and therefore should be made available to the user. In one embodiment, the threshold of visibility defines whether the asset is made available to the user. Further, the threshold of visibility may define whether the availability to the user is meaningful enough to be of worth to the user. That is, the threshold of visibility may define whether the asset is visible enough such that the asset is available for meaningful interaction (e.g., viewing, manipulation, understanding, etc.) to the user. For example, the asset may be visible to the user, but may not meet the threshold of visibility as the asset might be so small as to not allow the user to understand what the asset is, or how the asset moves within the gaming environment, or how the asset interacts with other assets in the gaming environment, or how to manipulate the asset, etc.

In some embodiments, computer vision implementing artificial intelligence (i.e., an AI model) is used to determine whether one or more assets in the video frame that has been mapped to the display screen of the target platform meet the threshold of visibility. In particular, computer vision technology can be implemented to identify any potential issues with displaying content of a corresponding video frame in a new layout (i.e., based on the mapping) on a device on a different platform, and whether those issues lead to any deficiencies on meeting the threshold of visibility. For example, by leveraging computer vision algorithms, inconsistencies using the new layout can be identified which may occur due to variations in screen sizes or resolutions across different platforms, such as crop-out resulting in missing elements or assets, misaligned elements, overlapping content, improper scaling, pixelation, etc.

Computer vision can be used to identify assets that are missing or cropped-out when mapping to the new layout.

For example, computer vision algorithms can identify what is missing between the content presented in the original video frame and the content presented in the mapped video frame (e.g., by testing different screen layouts). By testing the content presented on the different screens, and/or with different resolutions, and/or unconventional or limited dimensions, the computer vision algorithms can detect if any critical parts of the layout (e.g., assets including essential characters are missing or hidden (i.e., have been cropped-out). Computer vision can also be used to determine if there were any issues when scaling the video frame to the new layout that lead to a failure to meet the threshold of visibility. For instance scaling issues may include a distortion of the gaming environment, etc. Computer vision can also be used to identify any pixel issues affecting overall visual quality and/or clarity of the content, such as pixelation, blurriness, artifacts, etc. For example, by analyzing visual characteristics of the content, computer vision algorithms can be employed to identify instances of pixelation and their locations on the cross platform screen, wherein pixelation refers to the appearance of visible pixel blocks or distortion in an image or graphic.

At 280, the method includes modifying and/or transforming the video frame that is mapped so that the asset meets the threshold of visibility. The transformation may include one or more of scaling or resizing of the asset, dumb scaling of the video frame, pixel modification, changing a field of view (FOV), changing to a different content, changing the content to a different form, etc. Further, the video frame that is mapped and modified or transformed is delivered to the target device.

For example, transformation may involve rescaling the asset to a larger size, and then overlaying the asset that is rescaled within the video frame that has been mapped to the display device of the target platform. In another embodiment, transformation may include scaling or dumb scaling. For example, the entire video frame is scaled to fit the display device of the target platform, such that the video frame is rescaled (e.g., dumb scaling) to a smaller size.

In addition, transformation may include corrective measures to ensure that assets identified as being cropped-out are displayed on a screen of the target platform (i.e., meets the threshold of visibility). For example, the asset may be included as an overlay within the video frame that has been mapped. In another embodiment, transformation may include adjusting and/or moving pixels to address issues with pixels (e.g., pixelation, blurriness, artifacts, etc.) in order to enhance the overall visual quality and clarity of the content. For example, instances of pixelation that have been identified through AI (i.e., the appearance of visible pixel blocks or distortion in an image or graphic) can be corrected by applying image processing techniques, such as adjusting the resolution, etc.

In still another embodiment, transformation may include changing an FOV of the scene to the area of focus, and limiting the video frame that is modified to the FOV that is changed. The adjustments to FOV may be made based on game context (i.e., identifying what asset is important, or an area of focus that is relevant for the game context), and/or the characteristics of the display device of the target platform. In some embodiments, changing the FOV of the scene may include a dumb zooming into the area of focus or the asset determined to be important.

In one embodiment, the general process for modifying and/or transforming content may include one or more of, and in no particular order, scaling or mapping a video frame to fit a display of a target platform (e.g., dumb scaling-all to smaller sizes), analyzing the scaled video frame to determine if assets can be seen (i.e., assets meet a threshold of visibility), transforming (e.g., performing additional scaling, resizing, changing format of the asset, using a different asset, etc.) an asset that is visually compromised (i.e., not meeting the threshold of visibility) when that asset is a focus of game context (i.e., important within the game context), and performing a field of view (FOV) change (e.g., dumb zoom to area of focus, FOV scaling/targeting/zooming, etc.) if needed to enhance the transformation of the asset (e.g., dumb zooming to an area of focus surrounding the asset).

In one embodiment, the process for modifying and/or transforming content is performed in real-time, such as while playing a video game, content is modified and/or transformed for the display of the target platform that is detected. The process is adaptable for use during development of video games. Identification of issues with the display of the content can be performed using AI trained to perform quality assurance (QA) and/or audit testing to rapidly detect and highlight any problems or discrepancies in newly created layouts or layouts intended for specific cross-platforms. The testing and/or analysis of the display of content on the target platform can be performed for cloud streaming or for local execution in real-time in order to dynamically adapt the display of content based in part on the platform it is being viewed on and a visibility threshold to ensure that the layouts meet predefined design standards, guidelines, or compatibility requirements, enabling efficient identification and resolution of potential issues. For example, if the content is being accessed on a mobile device of a target platform, the layout and formatting will be adjusted to fit the smaller screen size to ensure optimal user experience.

In another embodiment, the process for modifying and/or transforming content is performed during development of a video game played under simulation. The process is adaptable for use during real-time execution of video games for game plays. More particularly, this service may be provided as a set of specialized tools for developers for testing and evaluating various aspects of the layouts, such as functionality, compatibility, and visual presentation. The tools can be used to help identify compliance of the visibility of assets in video frames generated during simulated game play of the video game and presented on one or more cross-platform devices. These developer tools assist in verifying that the layouts behave as intended, function properly across different platforms or devices, and adhere to design specifications. They can include features for previewing layouts, debugging code, simulating different environments, and collecting performance metrics, among others.

In particular, video frames can be generated using AI driven simulation of an executing video game, such as using AI personas to play the video game. That is, computer-controlled virtual characters or entities are utilized to simulate gameplay scenarios and interact with the game content. By employing AI personas, developers can spot potential issues (e.g., gameplay imbalances, glitches, or graphical inconsistencies, etc.) when mapping to new layouts of cross-platform devices by observing how the AI personas navigate through the game world and engage with various elements, mechanics, or visual aspects of the video game. This allows developers to identify and address any issues or inconsistencies in the layout design to cross platform devices. For example, a simulated game play by AI personas provide a preview of layouts of content on cross-platform devices before the video game is finalized. In particular, content of a video frame of a corresponding video game executed under simulation may be mapped to new layouts for each of a variety of platform devices for display, the content in the new layouts are analyzed and previewed to spot any issues for any of the platforms. For example, identification of issues with the display of the content can be performed using AI, using computer vision trained to perform quality assurance (QA) and/or audit testing, to quickly identify problems with the new layouts or layouts that are generated for a different platform. By visualizing the layout of content on cross-platform devices, the developers can ensure that all elements are properly aligned, sized, and styled to achieve the desired aesthetic and functional outcome.

Figure 3:
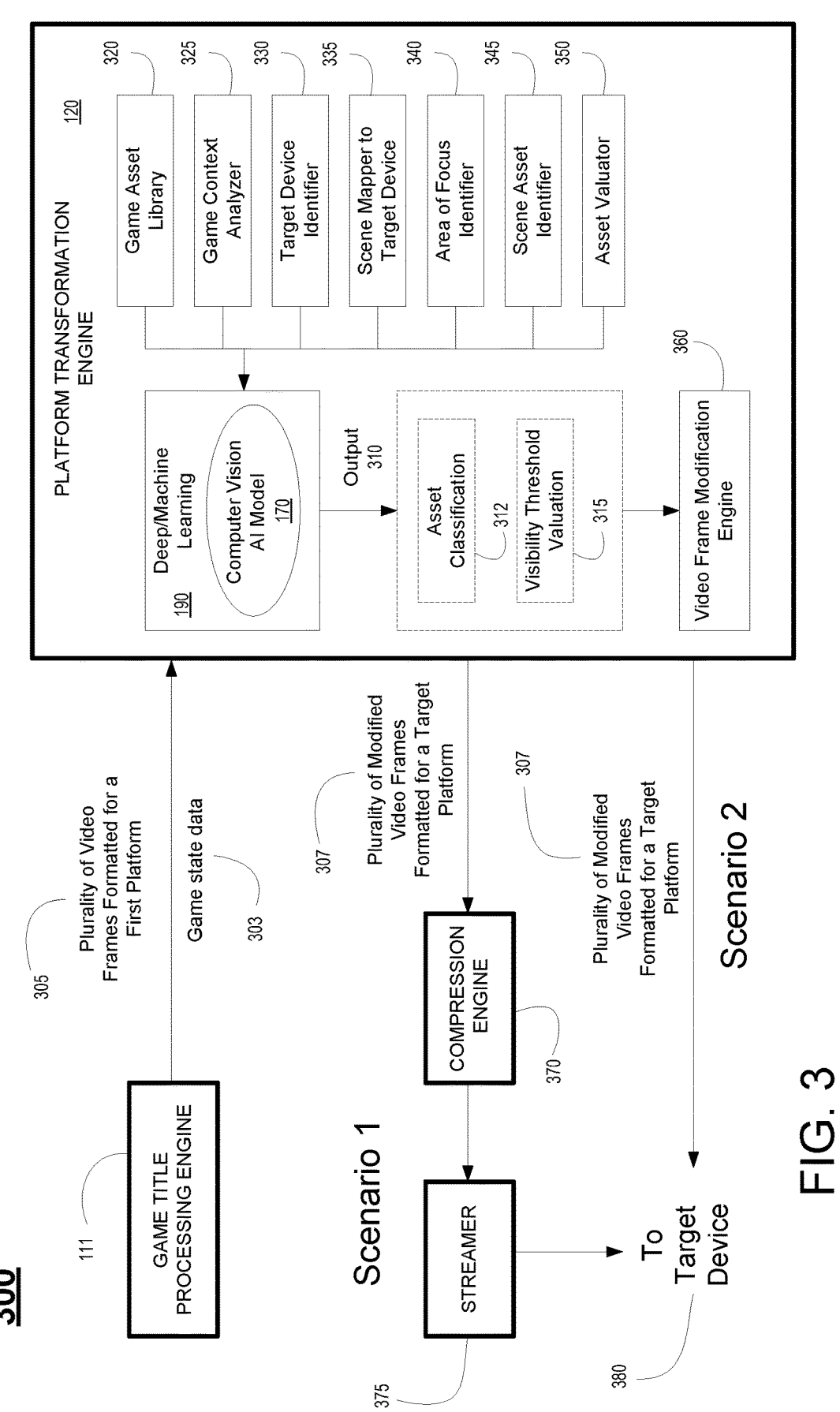
FIG. 3 is a data flow diagram illustrating the cross-platform modification of content using an AI model when streaming video content to a client device over a network and/or when delivering the video content locally to the client device, in accordance with embodiments of the present disclosure.

FIG. 3 is a data flow diagram 300 illustrating the cross-platform modification of content using an AI model 170 when streaming video content to a client device over a network and/or when delivering the video content locally to the client device, in accordance with embodiments of the present disclosure. The operations performed in the flow diagram may be implemented by one or more of the entities previously described components, and also system 100 described in FIG. 1, including the platform transformation engine 120. Cross-platform modification of content may be performed at a cloud gaming server when streaming modified content to a cross-platform device, or may be performed locally when delivering modified content to the cross-platform device.

As shown, the game title processing engine 111 executes game logic of a video game to generate a plurality of video frames 305 and game state data 303 in association with a game play of a user (e.g., single-player or multi-player gaming). As previously described, the game title processing engine may be remotely located at a cloud gaming server for streaming video frames to the user over a network (e.g., Scenario 1), or may be configured for local processing (e.g., Scenario 2) such as when the user is participating in a multi-player gaming session with local execution of the video game in coordination with a back-end server providing in part gaming updates from other players in the gaming session.

The executing video game generates the video frames that are formatted for presentation on a display device of a first platform, but are delivered and presented on a cross-platform device. For example, the video frames may be formatted for a gaming platform (e.g., presented on a full dimensioned display), but the user is playing the video game on a cross-platform, such as a mobile phone. Because there may be visual difficulties in displaying the video frames directly on the cross-platform device, the platform transformation engine 120 is configured to format the content in the video frames for presentation on the cross-platform device. In particular, the platform transformation engine receives and analyzes, using artificial intelligence implementing computer vision, the plurality of video frame 305 and the game state data 303 in order to identify issues cross-platform presentation, and to modify the content so as to ensure that display of important assets meet a threshold of visibility.

The platform transformation engine 120 includes a deep/machine learning engine 195 implementing the AI model 170 to identify and/or classify important assets in the content of the video frames and determine when there are visibility issues with those assets when presenting on a cross platform device. The AI model 170 may implement computer vision techniques to analyze visual inputs (e.g., video frames) to identify and/or classify the important assets, and to identify any issues when presenting the assets on the cross platform device. In addition, the AI model 170 may work in conjunction with one or more components configured to generate information related to the video frames 305 and corresponding game state data 303 and their presentation on a cross-platform device. The one or more components may generate corresponding information based in part on analysis of the video frames 305 and/or game state data 303.

For example, the game asset library 320 provides a list of assets for the corresponding video game, which can be used for training the AI model 170 to classify assets found within various scenes of the video game as presented in the video frames, and/or used for classification and/or verification of assets. Also, the game context analyzer 325 generates information corresponding to a game context of the scenes presented in the video frames 305. The target device identifier 330 generates information identifying the target, cross-platform device used for displaying the game play of the user. The mapper 335 is configured to map the scene in the video frames 305 to the target, cross platform device. For example, the video game and/or the executing platform may have a predesigned mapping to display the video frames 305 on the target, cross platform device. As an illustration, mapping may include dumb scaling, or cropping of content, etc. to fit the entirety of the content in the video frames 305 onto the display of the target, cross platform device. Also, the area of focus identifier 340 generates information corresponding to locations of a scene in the video frames that are the focus of the game play of the user, based on the game context that is identified. This may include a defined area within each of the video frames 305 that are the focus of the game play. Also, scene asset identifier 345 is configured to generate information related to known or predicted assets within the scene in the video frames. In addition, the scene asset identifier 345 may be configured to identify assets within the area of focus of the game play, previously identified. Also, asset valuator 350 generates information related to the importance of corresponding assets, such as assets found within the area of focus of the game play, based on the game context that is identified. For example, assets that are a focus of the game play based on the game context may be defined as having high importance.

As such, given one or more pieces of information (e.g., video frames 305, game state 303, information from the one or more components, etc.) as input, the AI model 170 implementing computer vision is configured to provide an output 310 including asset classification 312 of assets within the scene of the video frames 305, and visibility threshold valuations 315 for assets found within the scene in the video frames 305. Importantly, using AI techniques important assets within an area of focus are identified for the game context, and a determination is made whether those important assets meet a threshold of visibility.

When one or more important assets of a scene illustrated within a corresponding video frame does not meet a threshold of visibility, the video frame modification engine 360 is configured to modify and/or transform the content within the video frame so that at least the one or more important assets now meet the threshold of visibility. The threshold of visibility may define how well an asset can be viewed by the user, and/or may correspond, in part, with identification of issues with the layout of content displayed on the target, cross-platform device, as previously described. For example, transformation may include resizing assets, rescaling assets, changing the format of the asset, performing a FOV change or zoom, etc. In that manner, a modified video frame is generated that includes the modified and/or transformed content found in the original video frame. Repeating the process for at least all important assets or assets found within the area of focus for one or more video frames, a plurality of modified video frames 307 is generated that includes modified and/or transformed content found in the original video frames 305. The plurality of modified video frames 307 is configured for the target, cross-platform device for presenting the game play of the user.

As previously described, the platform transformation engine 120 may modify and/or transform content within video frames remotely at a back-end cloud gaming server when streaming game play of the user to the target device 380, or locally at a client device with delivery of the plurality of modified video frames 307 to the target, cross-platform device 380.

For example, scenario 1 illustrates streaming of content from the back-end server to the target device. In particular, the plurality of modified video frames 307 including modified and/or transformed content is compressed by the compression engine 370 using any suitable compression technique. The compressed data is delivered to the streamer 375 which coordinates delivery of the compressed data over a network to the target, cross-platform device 380 for presenting the plurality of modified video frames 307. That is, the platform transformation engine 120 works closely with the game title processing engine at the back-end, cloud gaming server.

For local processing, scenario 2 illustrates the direct delivery of the plurality of modified video frames 307 to the target, cross-platform device 380. In particular, compression is not performed because of the local proximity of devices (e.g., game title processing engine on a local gaming console or PC, and a local target device 380). In some implementations, the target, cross-platform device 380 (e.g., mobile phone) also is configured for processing the game logic of the video game using the game title processing engine 111, and for presenting the modified and/or transformed content. For instance, the user may be participating in a multi-player gaming session using the cross-platform device for execution of the video game, coordinating with the game server providing data related to the multi-player gaming session, and presenting the modified and/or transformed content. That is in embodiments, the platform transformation engine 120 may be located on the client device to deliver the modified and/or transformed content to the target, cross-platform device; or the platform transformation engine 120 may be located at the target, cross-platform device that is configured for both execution of the video game and for presenting the modified and/or transformed content (e.g., in single-player or multi-player gaming sessions).

Figure 4:
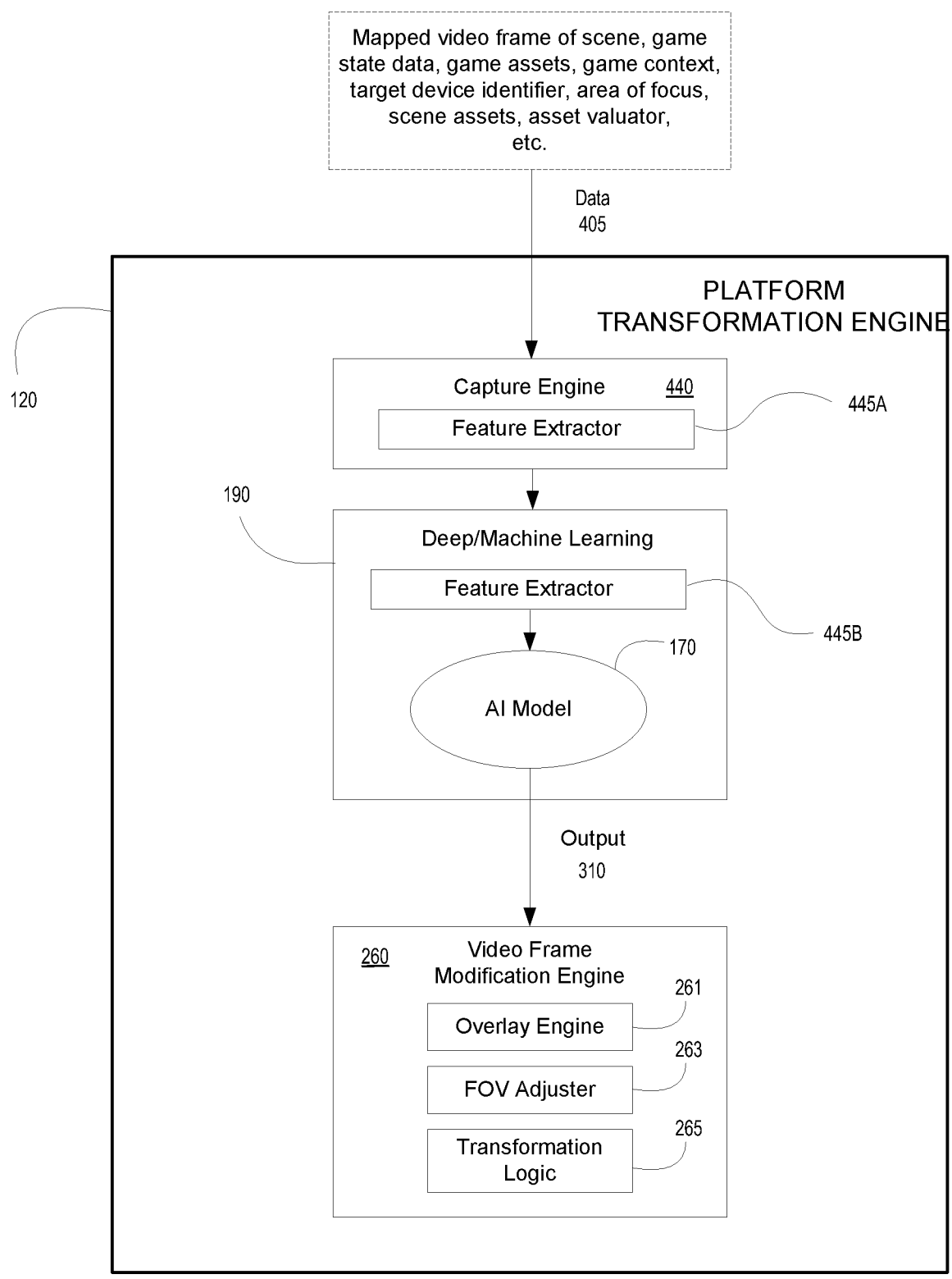
FIG. 4 is an illustration of a platform transformation engine implementing an AI model configured for classifying and identifying important assets in video content and the modification of display of those assets in order to meet visibility requirements in a cross-platform environment, in accordance with one embodiment of the present disclosure.

FIG. 4 is an illustration of a platform transformation engine 120 implementing an AI model 170 configured for classifying and identifying important assets in video content and the modification of display of those assets in order to meet visibility requirements in a cross-platform environment, in accordance with one embodiment of the present disclosure. Cross-platform modification of content performed by the platform transformation engine 120 may be performed at a cloud gaming server when streaming modified content to a cross-platform device, or may be performed locally when displaying on and/or delivering modified content to the cross-platform device.

Capture engine 440 of the platform transformation engine 120 is configured to receive various data 405 relevant to classifying assets of a scene provided in one or more video frames generated for a game play of a user for a video game. As previously described, the data 405 may include, in part, generated video frames, mapped video frames that are mapped to the target device, game state data, game assets, game context, target device identifier, area of focus identifier, scene assets, identified assets within the area of focus, asset valuations, user saved data, metadata, other information, etc. The capture engine 440 is configured to provide input into the AI model 170 for classification of assets of the scene illustrated in one or more video frames. As such, the capture engine 440 is configured to capture and/or receive as input any data that may be used to identify and/or classify those assets.

Selected portions of the captured data may be analyzed to identify and/or classify the assets of the scene illustrates in the one or more video frames. In particular, the received data 405 is analyzed by feature extractor 445A to extract out the salient and/or relevant features useful in classifying and/or identifying emotion of the user. The feature extractor may be configured to learn and/or define features that are associated with assets of the video game that are known, or portions thereof. In some implementations, feature definition and extraction is performed by the deep/machine learning engine 190, such that feature learning and extraction is performed internally, such as within the feature extractor 445B. In either case, the feature extractor may be trained using a list of assets presented in different gaming environments for the video game.

As shown, the deep/machine learning engine 190 is configured for implementation to classify and/or identify one or more assets of a scene illustrated in one or more video frames generated for the game play of the user, and any issues that may transpire when presenting those important assets on a cross-platform device. In one embodiment, the AI model 170 is a machine learning model configured to apply machine learning to classify and/or identify the assets of the scene illustrated in the video frames, and any issues in presenting those assets. In another embodiment, the AI model is a deep learning model configured to apply deep learning to classify and/or identify one or more assets of the scene illustrated in the video frames and any issues in presenting those assets on a cross-platform device, wherein machine learning is a sub-class of artificial intelligence, and deep learning is a sub-class of machine learning. In still other embodiments, the AI model 170 is configured to perform computer vision to classify assets of a scene in the video frames, and identify issues with visibility of those assets when displaying the content on the cross-platform device.

Purely for illustration, the deep/machine learning engine 190 may be configured as a neural network used to implement the AI model 170, in accordance with one embodiment of the disclosure. Generally, the neural network represents a network of interconnected nodes responding to input (e.g., extracted features) and generating an output (e.g., classify or identify or predict the intent of the performed gesture). In one implementation, the AI neural network includes a hierarchy of nodes. For example, there may be an input layer of nodes, an output layer of nodes, and intermediate or hidden layers of nodes. Input nodes are interconnected to hidden nodes in the hidden layers, and hidden nodes are interconnected to output nodes. Interconnections between nodes may have numerical weights that may be used link multiple nodes together between an input and output, such as when defining rules of the AI model 170.

In particular, the AI model 170 is configured to apply rules defining relationships between features and outputs (e.g., biometric corresponding to a particular emotion, etc.), wherein features may be defined within one or more nodes that are located at one or more hierarchical levels of the AI model 170. The rules link features (as defined by the nodes)

between the layers of the hierarchy, such that a given input set of data leads to a particular output (e.g., asset classification) 310 of the AI model 170. For example, a rule may link (e.g., using relationship parameters including weights) one or more features or nodes throughout the AI model 170 (e.g., in the hierarchical levels) between an input and an output, such that one or more features make a rule that is learned through training of the AI model 170. That is, each feature may be linked with one or more features at other layers, wherein one or more relationship parameters (e.g., weights) define interconnections between features at other layers of the AI model 170. As such, each rule or set of rules corresponds to a classified output. In that manner, the resulting output 310 according to the rules of the AI model 170 may classify and/or label and/or identify assets of the scene illustrated in the video frames generated for the game play of the user, and any issues that may transpire when presenting those important assets on a cross-platform device, based on the input data.

Further, the output 310 from the AI model 170 includes asset classification and/or a visibility threshold valuation for the assets, such as assets that are determined to be important for the given game context that is identified (e.g., assets that capture the attention of the user). The output 310 is delivered to the video frame modification and/or transformation engine 260, which is configured to perform content modification and/or transformation for, at least, important assets that are classified and that do not meet a visibility threshold for the scene illustrated in one or more video frames of a game play of a video game by a user as presented on a cross-platform device. In that manner, the modified content presented on the cross-platform device satisfies the visibility threshold such that those assets are viewable by the user suitable for the game play. Transformation and/or modification of content by the video frame modification engine 260 may be performed, at least in part, by an overlay engine 261, FOV adjuster 263, and/or transformation logic 265.

In particular, transformation logic 265 is configured to modify and/or transform the content, including one or more important assets. Transformation of the content may include resizing or rescaling assets so that they meet the threshold of visibility. In addition, transformation of the content may include a change of format. For example, the original content may be text, wherein the text after mapping to the cross-platform device does not meet the threshold of visibility (e.g., portions missing, too small, etc.). The text may be transformed to an emoji that replaces the text, wherein the emoji satisfies the threshold of visibility. In another example, the original content may be text provided within a window, wherein the text is expansive. The text after mapping to the cross-platform device does not meet the threshold of visibility. The text and window may be transformed from a static presentation of the text to a rolling text bar that may be presented within a resized window (i.e., the bar). In that manner, after the transformation, the rolling text bar now satisfies the threshold of visibility.

In one embodiment, the modified and/or transformed content may be presented as an overlay. In particular, the overlay engine 261 is configured to generate an overlay that includes the modified and/or transformed content, wherein the overlay is incorporated into one or more video frames generated by the video game to replace the original content. For example, the overlay including the modified content may be overlaid a portion of a video frame originally rendered for display on or for streaming to the intended platform device (e.g., fully display). In other embodiments, the modified and/or transformed content is blended into the video frame to generate a modified video frame.

In one embodiment, the video frame including the modified and/or transformed content may be further transformed using the FOV adjuster 263. For instance, when the modified and/or transformed content still does not meet the threshold of visibility, or to further enhance satisfaction of the threshold of visibility, the FOV adjuster 263 is configured to perform an FOV change or FOV zoom. For example, the video frame including the modified and/or transformed content may be further modified by zooming into the area of focus that is identified given a game context within the scene illustrated in the one or more video frames generated for the game play of the user playing the video game.

In that manner, after operation of the video frame modification engine, the modified video frame, including the modified and/or transformed content, is formatted for presentation on the cross-platform device, such that the assets in the modified video frame satisfy the threshold of visibility. Repeating the process for a plurality of video frames ensures that important assets and/or assets found within an area of focus of the video frames illustrating a scene satisfy the threshold of visibility when presenting the game play of the user for the video game on the cross-platform device.

Figure 5A:
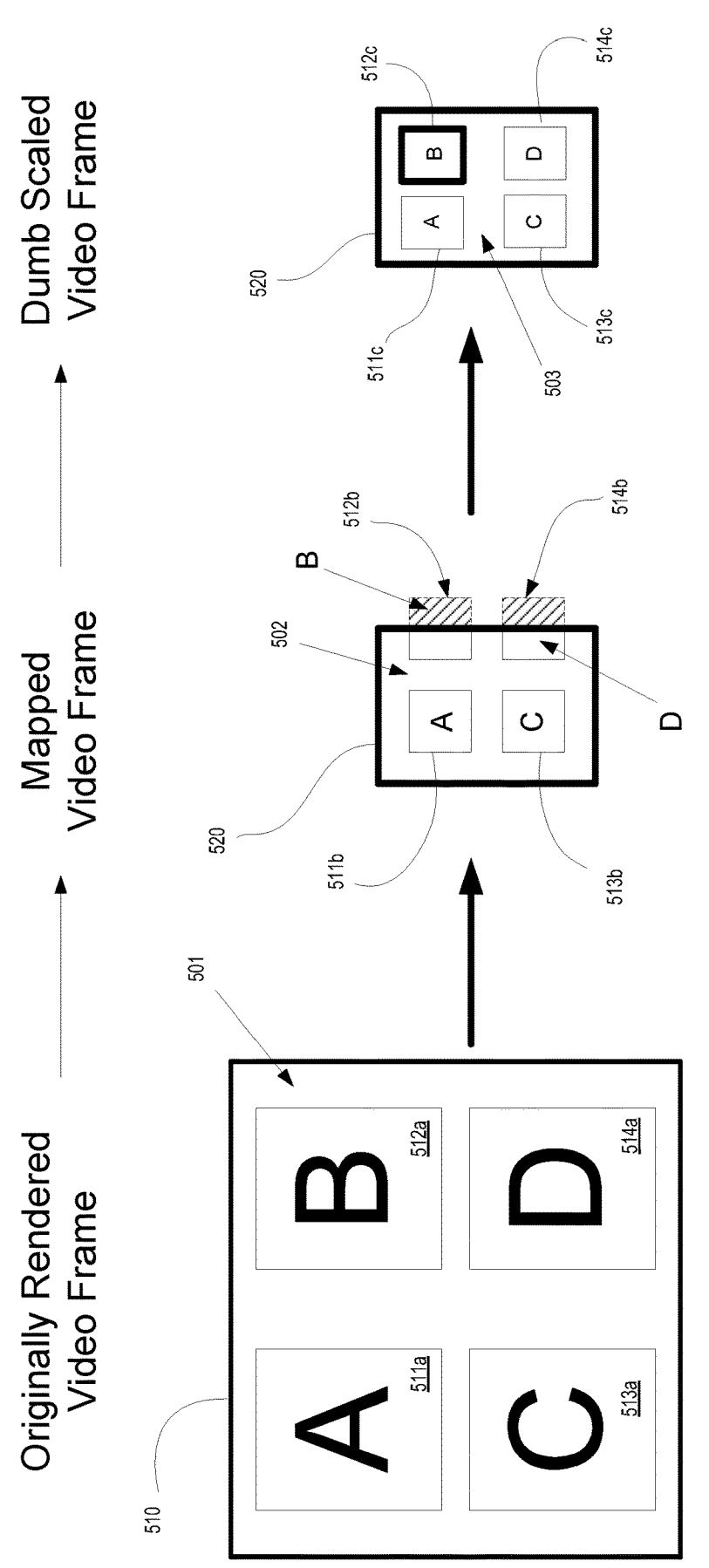
FIG. 5A illustrates mapping and/or scaling of an image frame for display on a target device, in accordance with one embodiment of the present disclosure.
Figure 5B:
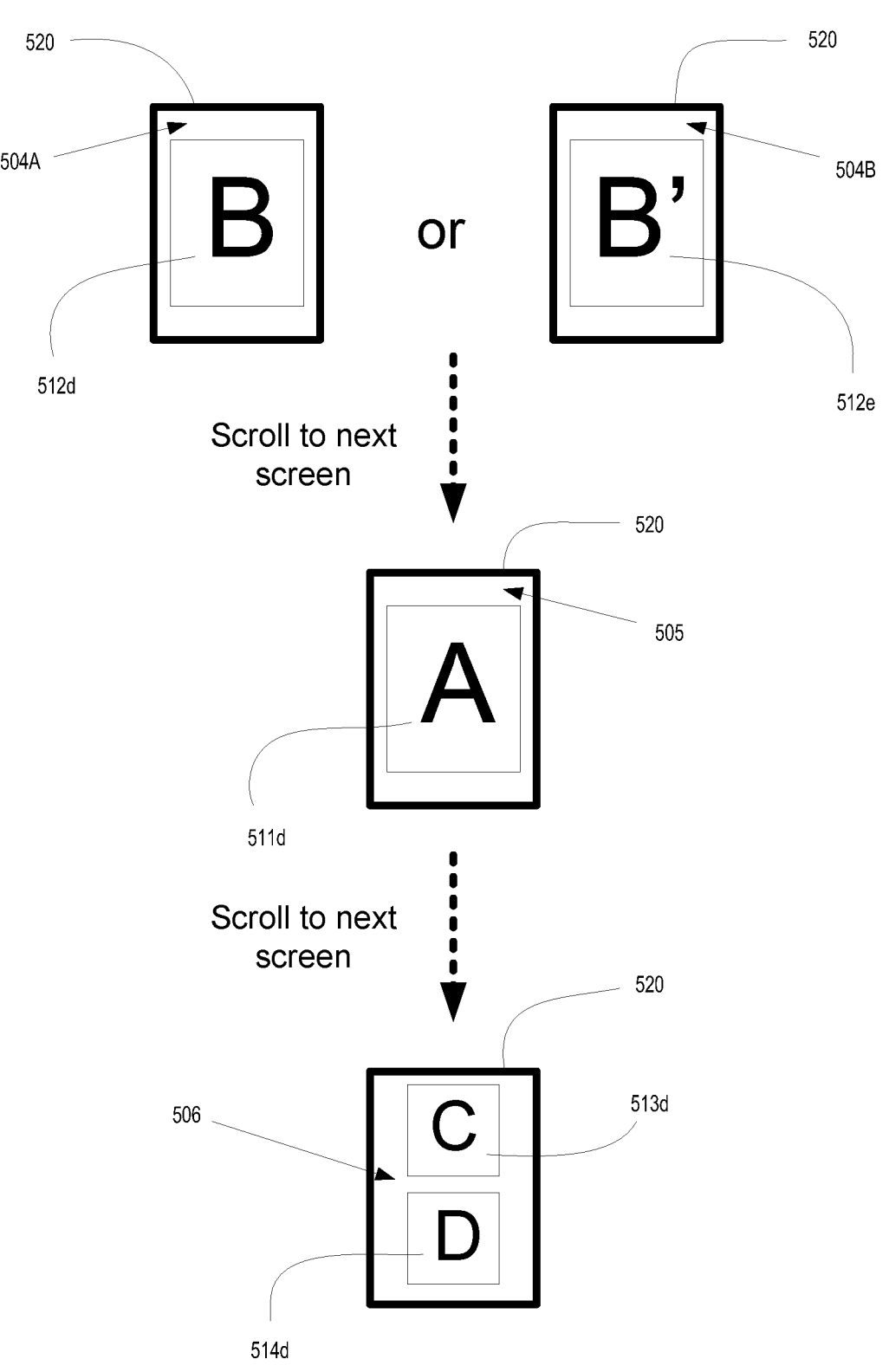
FIG. 5B illustrates a transformation of the image frame introduced in FIG. 5A for display on the target device, in accordance with one embodiment of the present disclosure.

FIGS. 5A-5B illustrate modification and/or transformation of content of a video frame generated for a game play of a video game by a user that is presented in a cross-platform device, in accordance with embodiments of the present disclosure. Generally, the process for modifying and/or transforming content may be shown in FIGS. 5A-5B may include mapping and/or scaling a video frame to fit a display of a target, cross-platform device, analyzing the scaled video frame to determine important assets and if those assets can be seen (i.e., assets meet a threshold of visibility), transforming an important asset (a focus of or important within the game context) that is visually compromised (i.e., not meeting the threshold of visibility), and/or optionally performing an FOV change (e.g., dumb zoom to an area of focus).

In particular, FIG. 5A illustrates mapping and/or scaling of a video frame 501 for display on a target, cross-platform device, in accordance with one embodiment of the present disclosure. As shown, the video frame 501 is generated during the game play of the user, wherein the video frame is originally rendered for presentation on an intended platform device, such as display 510 which is fully dimensioned for displaying video frames for gaming, or for streaming to the intended platform device. For example, the originally rendered video frame 501 includes content illustrating a scene, wherein the content may be represented by one or more assets, including asset A (511), asset B (512), asset C (513), and asset D (514). The assets are shown in a first format for presentation on the display 510 of the intended platform device, and include asset A (511a), asset B (512a), asset C (513a), and asset D (514a). Because the original video frame 501 is rendered without compromise for presentation on the intended platform device, all of the assets are shown, and presumably if presented on the display of the intended platform device, each of the assets meet a corresponding threshold of visibility.

Because the game play of the user is presented on a display 520 of a cross-platform device (e.g., mobile phone), the content in the originally rendered video frame 501 is mapped to the cross-platform device, which may include some scaling of assets, wherein the mapping may be pre-designed for the video game, or for the executing processor when mapping to a target device. After mapping, the assets are shown in a second format for presentation on the display 520 of the target, cross-platform device, and include asset A (511b), asset B (512b), asset C (513b), and asset D (514b). For example, each of the assets may have been resized and/or rescaled. The mapped video frame 502 as presented on display 520 may include issues with the presentation. For instance, assets B (511b) and C (511c) are shown with missing portions (i.e., half of each of the assets are off of display 520 and are not shown).

Because there are issues that have been identified in the mapped video frame 502, additional scaling may be performed. For example, dumb scaling (assets are scaled to smaller sizes) of the mapped video frame 502 is performed so that all of the assets are available for viewing on the display 520. In addition, one or more assets are identified as being important, at least for the given game context of the originally rendered video frame 501. For example, asset B may be determined to be important and is highlighted (i.e., bolded outline) in the dumb scaled video frame 503. After rescaling, the assets are shown in a third format for presentation on the display 520 of the target, cross-platform device, and include asset A (511c), asset B (512c), asset C (513c), and asset D (514c). For example, each of the assets have been further rescaled and/or resized, such that each of the assets are shown on display 520.

FIG. 5B illustrates a transformation of the originally rendered video frame 501 introduced in FIG. 5A for display on the target, cross-platform device, in accordance with one embodiment of the present disclosure. In particular, further analysis is performed on the scaled video frame 503 to determine if there are issues when presenting the scaled video frame 503 on the target device. For example, it may be determined whether each of the assets A-D, and more particularly whether each of the important assets (e.g., asset B) satisfies a threshold of visibility. Because asset B as presented in the scaled video frame 503 may not satisfy the threshold of visibility (e.g., too small to be viewed for sufficient gaming), transformation and/or modification of the content is performed, as previously described. For example, as shown, asset B (512d) may be rescaled and/or resized to be larger in a fourth format, wherein the rescaled video frame 504A is presented on the display 520 of the target, cross-platform device. In addition, the scaled video frame 503 may also be modified and/or transformed, such that only asset B (512d) that is rescaled and/or resized is shown on display 520. Alternatively, transformation and/or modification of the content may be performed by changing a format for asset B, as represented by the reformatted asset B' (512e) (e.g., transforming text to an emoji). That is, a replacement asset may be used. Also, the reformatted asset B' (513e) may be automatically resized, wherein the resized and/or reformatted video frame 504B is presented on the display 520 of the target, cross-platform device.

Because the content of the originally rendered video frame 501 has been transformed to be presented in scrolling fashion, subsequent video frames show remaining assets. In one embodiment, remaining assets are shown in order of importance. For example, it may be determined that in the remaining assets, asset A is more important than either of assets C or D. As such, when scrolling to the next screen, asset A (511d) may be rescaled and/or resized to be larger to a sixth format, wherein the rescaled portion of the video frame 505 is presented on the display 520 of the target, cross-platform device, such that only asset A (511d) that is rescaled and/or resized is shown on display 520. Thereafter, remaining assets C and D are of equal but lesser importance than that for assets B or A, such that assets C and D may be shown together on a screen. As such, when scrolling to the next screen each of asset C (513*d*) and asset D (514*d*) may be rescaled and/or resized to a seventh format, wherein the reformatted portion of the video frame 506 is presented on display 520 of the target, cross-platform device. For purposes of illustration, asset C may be shown above asset D on display 520, but may be shown in any suitable layout.

Though not shown, in another embodiment, to enhance the presentation of the content, a FOV change (e.g., dumb zoom to area of focus, FOV scaling/targeting/zooming, etc.) may be performed in a further transformation of the asset and/or video frame. For instance, dumb zooming to an area of focus surrounding the important asset may be performed.

Figure 6:
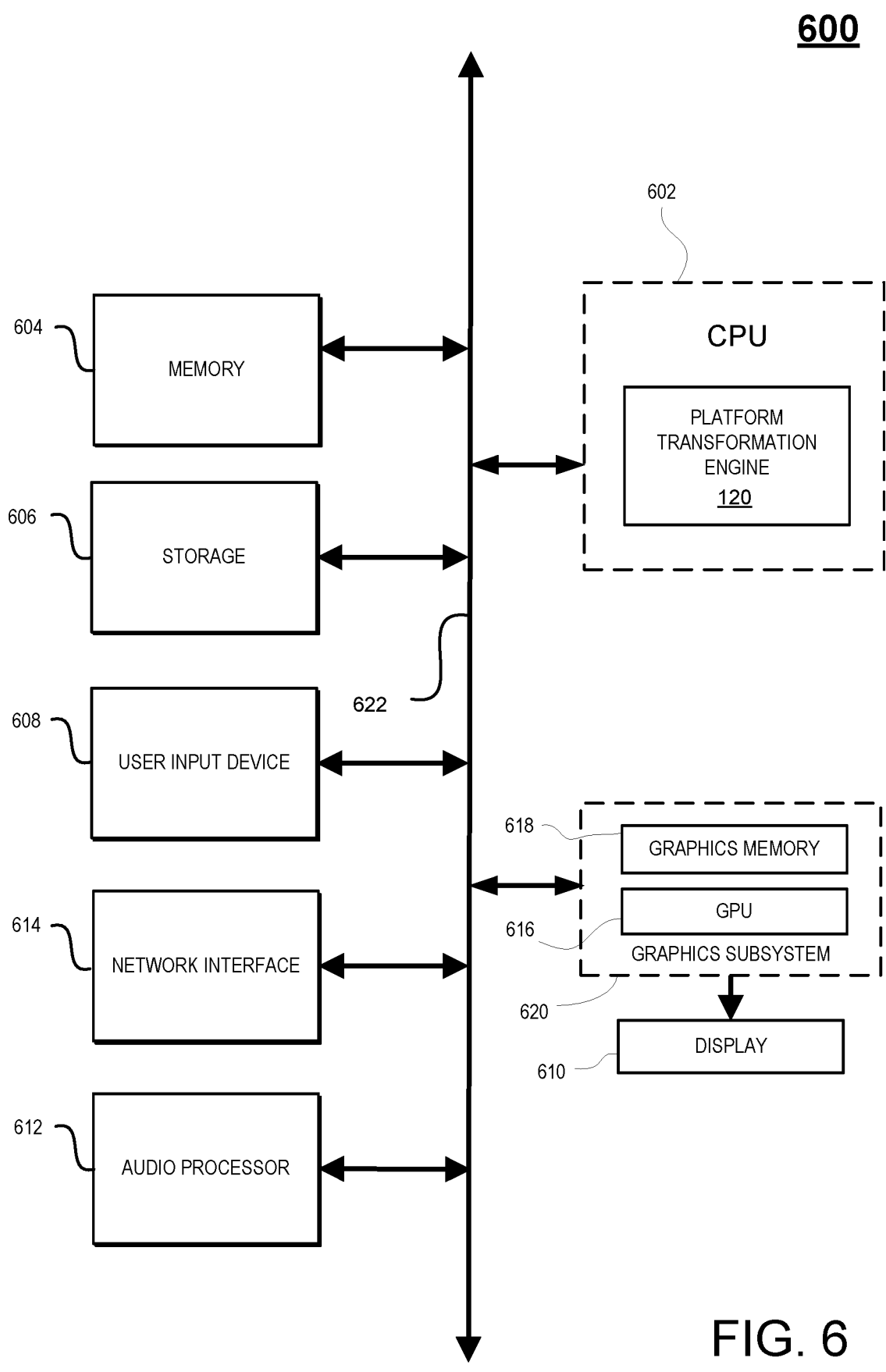
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, and includes a central processing unit (CPU) 602 for running software applications and optionally an operating system. CPU 602 may be comprised of one or more homogeneous or heterogeneous processing cores. Further embodiments can be implemented using one or more CPUs with microprocessor architectures specifically adapted for highly parallel and computationally intensive applications.

In particular, CPU 602 may be configured to implement a platform prediction engine 120 implementing artificial intelligence that is configured to identify important assets in video content and ensure that display of those important assets meet a visibility requirement to include modifying content of a video game when delivering video frames for display on a cross-platform device. The identification of visibility issues when displaying content on a cross-platform device using artificial intelligence may be performed during development of a video game or in real-time during game play of the video game.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within an AI engine (e.g., machine learning engine 190) to provide additional processing power, such as for the AI, machine learning functionality, or deep learning functionality, etc.

The graphics subsystem 720 periodically outputs pixel data for an image from graphics memory 718 to be displayed on display device 710. Display device 710 can be any device capable of displaying visual information in response to a signal from the device 700.

In other embodiments, the graphics subsystem 720 includes multiple GPU devices, which are combined to perform graphics processing for a single application that is executing on a CPU. For example, the multiple GPUs can perform alternate forms of frame rendering, including different GPUs rendering different frames and at different times, different GPUs performing different shader operations, having a master GPU perform main rendering and compositing of outputs from slave GPUs performing selected shader functions (e.g., smoke, river, etc.), different GPUs rendering different objects or parts of scene, etc. In the above embodiments and implementations, these operations could be performed in the same frame period (simultaneously in parallel), or in different frame periods (sequentially in parallel).

Accordingly, in various embodiments the present disclosure describes systems and methods configured for cross-platform modification of content using artificial intelligence such that important assets meet a threshold of visibility requirement.

It should be noted, that access services, such as providing access to games of the current embodiments, delivered over a wide geographical area often use cloud computing. Cloud computing is a style of computing in which dynamically scalable and often virtualized resources are provided as a service over the Internet. For example, cloud computing services often provide common applications (e.g., video games) online that are accessed from a web browser, while the software and data are stored on the servers in the cloud.

A game server may be used to perform operations for video game players playing video games over the internet, in some embodiments. In a multiplayer gaming session, a dedicated server application collects data from players and distributes it to other players. The video game may be executed by a distributed game engine including a plurality of processing entities (PEs) acting as nodes, such that each PE executes a functional segment of a given game engine that the video game runs on. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. The PEs may be virtualized by a hypervisor of a particular server, or the PEs may reside on different server units of a data center. Respective processing entities for performing the operations may be a server unit, a virtual machine, or a container, GPU, CPU, depending on the needs of each game engine segment. By distributing the game engine, the game engine is provided with elastic computing properties that are not bound by the capabilities of a physical server unit. Instead, the game engine, when needed, is provisioned with more or fewer compute nodes to meet the demands of the video game.

Users access the remote services with client devices (e.g., PC, mobile phone, etc.), which include at least a CPU, a display and I/O, and are capable of communicating with the game server. It should be appreciated that a given video game may be developed for a specific platform and an associated controller device. However, when such a game is made available via a game cloud system, the user may be accessing the video game with a different controller device, such as when a user accesses a game designed for a gaming console from a personal computer utilizing a keyboard and mouse. In such a scenario, an input parameter configuration defines a mapping from inputs which can be generated by the user's available controller device to inputs which are acceptable for the execution of the video game.

In another example, a user may access the cloud gaming system via a tablet computing device, a touchscreen smartphone, or other touchscreen driven device, where the client device and the controller device are integrated together, with inputs being provided by way of detected touchscreen inputs/gestures. For such a device, the input parameter configuration may define particular touchscreen inputs corresponding to game inputs for the video game (e.g., buttons, directional pad, gestures or swipes, touch motions, etc.).

In some embodiments, the client device serves as a connection point for a controller device. That is, the controller device communicates via a wireless or wired connection with the client device to transmit inputs from the controller device to the client device. The client device may in turn process these inputs and then transmit input data to the cloud game server via a network. For example, these inputs might include captured video or audio from the game environment that may be processed by the client device before sending to the cloud game server. Additionally, inputs from motion detection hardware of the controller might be processed by the client device in conjunction with captured video to detect the position and motion of the controller before sending to the cloud gaming server.

In other embodiments, the controller can itself be a networked device, with the ability to communicate inputs directly via the network to the cloud game server, without being required to communicate such inputs through the client device first, such that input latency can be reduced. For example, inputs whose detection does not depend on any additional hardware or processing apart from the controller itself can be sent directly from the controller to the cloud game server. Such inputs may include button inputs, joystick inputs, embedded motion detection inputs (e.g., accelerometer, magnetometer, gyroscope), etc.

Access to the cloud gaming network by the client device may be achieved through a network implementing one or more communication technologies. In some embodiments, the network may include 5th Generation (5G) wireless network technology including cellular networks serving small geographical cells. Analog signals representing sounds and images are digitized in the client device and transmitted as a stream of bits. 5G wireless devices in a cell communicate by radio waves with a local antenna array and low power automated transceiver. The local antennas are connected with a telephone network and the Internet by high bandwidth optical fiber or wireless backhaul connection. A mobile device crossing between cells is automatically transferred to the new cell. 5G networks are just one communi-cation network, and embodiments of the disclosure may utilize earlier generation communication networks, as well as later generation wired or wireless technologies that come after 5G.

In one embodiment, the various technical examples can be implemented using a virtual environment via a head-mounted display (HMD), which may also be referred to as a virtual reality (VR) headset. As used herein, the term generally refers to user interaction with a virtual space/environment that involves viewing the virtual space through an HMD in a manner that is responsive in real-time to the movements of the HMD (as controlled by the user) to provide the sensation to the user of being in the virtual space or metaverse. An HMD can be worn in a manner similar to glasses, goggles, or a helmet, and is configured to display a video game or other metaverse content to the user. The HMD can provide a very immersive experience in a virtual environment with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures (e.g., commands, communications, pointing and walking toward a particular content item in the scene, etc.). In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network, such as internet, cellular, etc. In one embodiment, the cloud computing and gaming system maintains and executes the video game being played by the user. In some embodiments, the cloud computing and gaming system is configured to receive inputs from the HMD and/or interfacing objects over the network. The cloud computing and gaming system is configured to process the inputs to affect the game state of the executing video game. The output from the executing video game, such as video data, audio data, and haptic feedback data, is transmitted to the HMD and the interface objects.

Additionally, though implementations in the present disclosure may be described with reference to n HMD, it will be appreciated that in other implementations, non-HMDs may be substituted, such as, portable device screens (e.g., tablet, smartphone, laptop, etc.) or any other type of display that can be configured to render video and/or provide for display of an interactive scene or virtual environment. It should be understood that the various embodiments defined herein may be combined or assembled into specific implementations using the various features disclosed herein. Thus, the examples provided are just some possible examples, without limitation to the various implementations that are possible by combining the various elements to define many more implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein in embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server, or by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator that emulates a processing system.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
executing a video game to generate a video frame for presentation on a first device of a first platform, wherein the video frame is generated for a game play of the video game by a user;
determining a target device, wherein the target device is of a second platform;
mapping the video frame from the first device to the target device, wherein the video frame that is mapped is presented on the target device;
determining an area of focus in a scene of the game play presented in the video frame based on a game context of the scene in the game play;
classifying an asset in the area of focus using a computer vision model implementing artificial intelligence;
determining that the asset is important in the game play of the video game using the computer vision model;
dumb scaling the video frame to a smaller size for presentation on the target device;
determining that the asset in the dumb scaled video frame that is mapped to the target device does not meet a threshold of visibility; and
modifying the dumb scaled video frame that is mapped so that the asset meets the threshold of visibility.

2. The method of claim 1, further comprising:
sending the video frame that is mapped and modified to the target device.

3. The method of claim 1, wherein the modifying the video frame that is mapped includes:
transforming the asset through rescaling; and
overlaying the asset that is rescaled within the video frame that is mapped.

4. The method of claim 1, wherein the modifying the video frame that is mapped includes:
changing a field of view (FOV) of the scene to the area of focus; and
limiting the video frame that is modified to the FOV that is changed.

5. The method of claim 1, wherein the determining the area of focus includes:
determining a focus of interaction by the user in the scene of the game play.

6. The method of claim 1, further comprising:
training the computer vision model using a list of assets for the video game.

7. A non-transitory computer-readable medium storing a computer program for execution by a processor to perform a method, the non-transitory computer-readable medium comprising:

program instructions for executing a video game to generate a video frame for presentation on a first device of a first platform, wherein the video frame is generated for a game play of the video game by a user;

program instructions for determining a target device, wherein the target device is of a second platform;

program instructions for mapping the video frame from the first device to the target device, wherein the video frame that is mapped is presented on the target device;

program instructions for determining an area of focus in a scene of the game play presented in the video frame based on a game context of the scene in the game play;

program instructions for classifying an asset in the area of focus using a computer vision model implementing artificial intelligence;

program instructions for determining that the asset is important in the game play of the video game using the computer vision model;

program instructions for dumb scaling the video frame for presentation on the target device;

program instructions for determining that the asset in the dumb scaled video frame that is mapped to the target device does not meet a threshold of visibility; and program instructions for modifying the dumb scaled video frame that is mapped so that the asset meets the threshold of visibility.

8. The non-transitory computer-readable medium of claim 7, further comprising:

program instructions for sending the video frame that is mapped and modified to the target device.

9. The non-transitory computer-readable medium of claim 7, wherein the program instructions for modifying the video frame that is mapped includes:

program instructions for transforming the asset through rescaling; and program instructions for overlaying the asset that is rescaled within the video frame that is mapped.

10. The non-transitory computer-readable medium of claim 7, wherein the program instructions for modifying the video frame that is mapped includes:

program instructions for changing a field of view (FOV) of the scene to the area of focus; and program instructions for limiting the video frame that is modified to the FOV that is changed.

11. The non-transitory computer-readable medium of claim 7, wherein the program instructions for determining the area of focus includes:

program instructions for determining a focus of interaction by the user in the scene of the game play.

12. The non-transitory computer-readable medium of claim 7, further comprising:

program instructions for training the computer vision model using a list of assets for the video game.

13. A computer system comprising:

a processor;

memory coupled to the processor and having stored therein instructions that, if executed by the computer system, cause the computer system to execute a method for implementing a graphics pipeline, comprising:

executing a video game to generate a video frame for presentation on a first device of a first platform, wherein the video frame is generated for a game play of the video game by a user;

determining a target device, wherein the target device is of a second platform;

mapping the video frame from the first device to the target device, wherein the video frame that is mapped is presented on the target device;

determining an area of focus in a scene of the game play presented in the video frame based on a game context of the scene in the game play;

dumb scaling the video frame for presentation on the target device;

determining an asset in the area of focus is important in the game play of the video game using a computer vision model implementing artificial intelligence;

classifying the asset using the computer vision model;

determining that the asset in the dumb scaled video frame that is mapped to the target device does not meet a threshold of visibility; and modifying the dumb scaled video frame that is mapped so that the asset meets the threshold of visibility.

14. The computer system of claim 13, the method further comprising:

sending the video frame that is mapped and modified to the target device.

15. The computer system of claim 13, wherein in the method the modifying the video frame that is mapped includes:

changing a field of view (FOV) of the scene to the area of focus; and limiting the video frame that is modified to the FOV that is changed.

16. The computer system of claim 13, wherein in the method the determining the area of focus includes:

determining a focus of interaction by the user in the scene of the game play.

17. The computer system of claim 13, the method further comprising:

training the computer vision model using a list of assets for the video game.

* * * * *